US005474735A

United States Patent [19]
Krishnakumar et al.

[11] Patent Number: 5,474,735
[45] Date of Patent: Dec. 12, 1995

[54] PULSE BLOW METHOD FOR FORMING CONTAINER WITH ENHANCED THERMAL STABILITY

[75] Inventors: Suppayan M. Krishnakumar, Nashua; Wayne N. Collette, Merrimack, both of N.H.; Nikhil Mani, Billerica, Mass.

[73] Assignee: Continental PET Technologies, Inc., Florence, Ky.

[21] Appl. No.: 126,976

[22] Filed: Sep. 24, 1993

[51] Int. Cl.$^6$ ............................ B29C 49/12; B29C 49/18
[52] U.S. Cl. ............................ 264/529; 264/526; 264/905
[58] Field of Search ................................. 264/529, 530, 264/526, 528, 532

[56] References Cited

U.S. PATENT DOCUMENTS

| | | | |
|---|---|---|---|
| 4,144,298 | 3/1979 | Lee | 264/532 |
| 4,177,239 | 12/1979 | Gittner | 264/529 |
| 4,334,627 | 6/1982 | Krishnakumar et al. . | |
| 4,385,089 | 5/1983 | Bonnebat et al. | 264/529 |
| 4,522,779 | 6/1985 | Jabarin | 264/530 |
| 4,710,118 | 12/1987 | Krishnakumar et al. . | |
| 4,717,324 | 1/1988 | Schad . | |
| 4,725,464 | 2/1988 | Collette et al. . | |
| 4,755,404 | 7/1988 | Collette . | |
| 4,781,954 | 11/1988 | Krishnakumar . | |
| 4,803,036 | 2/1989 | Maruhashi et al. | 264/526 |
| 4,853,171 | 8/1989 | Ajmera . | |
| 4,863,046 | 9/1989 | Collette et al. . | |
| 4,871,507 | 10/1989 | Ajmera . | |
| 4,950,143 | 8/1990 | Krishnakumar . | |
| 4,990,301 | 2/1991 | Krishnakumar . | |
| 5,066,528 | 11/1991 | Krishnakumar et al. . | |
| 5,178,816 | 1/1993 | Suzuki | 264/530 |

FOREIGN PATENT DOCUMENTS

| | | | |
|---|---|---|---|
| 9064862 | 10/1990 | Australia . | |
| 43782 | 1/1982 | European Pat. Off. | 264/529 |
| 0155763 | 9/1985 | European Pat. Off. . | |
| 0197780A3 | 10/1986 | European Pat. Off. . | |
| 0237459A1 | 9/1987 | European Pat. Off. . | |
| 0494098A1 | 7/1992 | European Pat. Off. . | |
| 1600585 | 9/1970 | France | 264/529 |
| 1600584 | 9/1970 | France | 264/529 |
| 2215304 | 8/1974 | France . | |
| 2387757 | 11/1978 | France . | |
| 2550990 | 3/1985 | France . | |
| 1960129 | 7/1970 | Germany . | |
| 3221273A1 | 12/1983 | Germany . | |
| 242370 | 1/1987 | Germany | 264/529 |
| 57-77536 | 5/1982 | Japan . | |
| 58-56828A | 4/1983 | Japan . | |
| 58-220711 | 12/1983 | Japan | 264/530 |
| 59-002820 | 1/1984 | Japan | 264/530 |
| 61-268426 | 11/1986 | Japan . | |
| 63-122516 | 5/1988 | Japan . | |
| 1-157828 | 6/1989 | Japan . | |
| 1-310933 | 12/1989 | Japan . | |
| 2-59318 | 2/1990 | Japan | 264/529 |
| 2-209219 | 8/1990 | Japan . | |
| 4144731 | 5/1992 | Japan . | |

(List continued on next page.)

*Primary Examiner*—Catherine Timm
*Attorney, Agent, or Firm*—Wolf, Greenfield & Sacks

[57] ABSTRACT

A method and apparatus for forming a plastic container having an enhanced level of crystallinity for improved thermal stability. A substantially amorphous and transparent preform in the molecular orientation temperature range is expanded by a pulse-blow process one or more times to form an intermediate article, prior to a final expansion step to the full container dimensions. The pulse-blow step is conducted at a relatively high-strain rate to maximize the formation of crystal nucleation sites, followed by deflation to relax the amorphous orientation, and the final expansion step is conducted at a low-strain rate to minimize the amorphous orientation. The resulting container has a higher thermal deformation temperature and reduced thermal shrinkage and is particularly adapted for use as a refillable or hot-fill beverage container. A blow-mold and fluid supply apparatus is provided, including a metering chamber and piston, for alternatively supplying the high and low-strain rate inflations.

8 Claims, 4 Drawing Sheets

FOREIGN PATENT DOCUMENTS

| | | |
|---|---|---|
| 1341845 | 12/1973 | United Kingdom . |
| 1481637 | 8/1977 | United Kingdom . |
| 2004805 | 4/1979 | United Kingdom . |
| 2050919 | 1/1981 | United Kingdom . |
| 2108899 | 5/1983 | United Kingdom . |
| 2150488 | 7/1985 | United Kingdom . |
| WO86/03713 | 7/1986 | WIPO . |

PULSE BLOW METHOD FOR FORMING CONTAINER WITH ENHANCED THERMAL STABILITY

FIELD OF THE INVENTION

The present invention concerns a method of forming a container with enhanced thermal stability, such as a transparent polyester refill or hot-fill beverage container, and more particularly to a method which includes one or more preliminary pulse blow inflations at a high-strain rate in order to increase the crystallinity level in the body of the formed container.

BACKGROUND OF THE INVENTION

There is a class of "crystallizable" polymers useful in the blow mold container art which includes polyesters, such as polyethylene terephthalate (PET), and polyamides, such as nylon-6 and nylon-66. In an amorphous state, such as produced by rapid quenching from the melt, these polymers have relatively low levels of mechanical properties. However, when properly oriented and crystallized, these polymers exhibit a very high tensile modulus and impact resistance enabling the production of a high-strength container at a relatively low weight of material per container.

PET has been in use for over twenty years for carbonated beverage containers, and more recently has been adapted for refillable carbonated beverage containers and hot-fill containers, each of which require a high level of thermal stability. A high thermal stability container can resist distortion and shrinkage when subjected to an elevated temperature during use. A refillable container must withstand a hot caustic wash for cleaning and sterilization, during each reuse cycle. A hot-fill container must withstand an elevated product fill temperature required for sterilization, as is customary with juice and milk products.

Generally, increasing the percent crystallinity of the container increases the resistance to thermal deformation and shrinkage. However, increasing the crystallinity also generally reduces the transparency of the container. In fields such as the carbonated beverage industry where there are strict requirements regarding the transparency of the containers, it is difficult to achieve the required crystallinity levels without also producing opacity or haze in the container.

In the past, the principal mechanism of increasing the crystallinity of PET containers has been by heat setting. Heat setting was performed after the container was expanded, the expanded container being held at an elevated temperature and pressure for a few minutes to increase the crystallinity level and relieve residual stresses. However, the heat setting process adds significantly to the cost of production.

Another method for increasing resistance to distortion caused by hot filling and/or high impacts, is to provide a sidewall having vacuum panels and ribs to reinforce the sidewall. Such a container is described in U.S. Pat. No. 5,178,289 to Krishnakumar et al. entitled "Panel Design For A Hot-Fillable Container," which issued Jan. 12, 1993.

Another method of increasing resistance to deformation caused by hot filling is to add to the container, immediately after filling, liquid nitrogen followed by immediate closing of the container, wherein the liquid nitrogen becomes nitrogen gas and internally pressurizes the container to prevent vacuum collapse. Such a container is described in U.S. Pat. No. 5,104,706 to Krishnakumar et al. entitled "Preform For Hot-Fill Pressure Container," which issued Apr. 14, 1992.

Another method for increasing the thermal stability of a container is to provide a multi-layer construction including inner and outer layers of PET and a central layer of a plastic having a high glass transition temperature ($T_g$). Such a container is described in U.S. Pat. No. 5,049,345 to Collette et al. entitled "Method Of Forming A Multi-Layer Preform," which issued Sep. 17, 1991. The high $T_g$ polymer may be a copolyester which is preferred due their melt solubility and resulting adhesion to PET. Non-polyesters such as acrylonitrile styrene, acrylonitrile styrene copolymers, polycarbonate, etc. could also be utilized. The higher $T_g$ material may form a central core layer of a three-layer sidewall construction, or inner and outer intermediate layers between inner, core and outer layers in a five-layer construction.

It is an object of this invention to provide a method and apparatus for blow molding a preform into a container which provides an enhanced level of crystallinity in the body of the container in order to provide enhanced thermal stability. This method may be used alone or in combination with prior art methods for enhancing thermal stability, e.g., heat setting, multi-layer construction, vacuum panel design, etc.

SUMMARY OF THE INVENTION

A method and apparatus is provided for enhancing the level of crystallinity in a blow-molded container. According to the method, a heated preform is provided of an orientable and crystallizable polymer at a temperature in the orientation temperature range of the polymer. The preform is substantially transparent and amorphous. The preform includes an elongated body-forming portion and a base-forming portion.

According to the method, the preform is subjected to at least one pulse-blow step in a cavity of a blow mold to form a substantially transparent and at least partially crystalline intermediate article. The pulse-blow step consists of expanding at least a portion of the body-forming portion axially and radially at a first high-strain rate of inflation to maximize the crystal nucleation sites in the expanded body-forming portion. The expanded body-forming portion is then held at a low pressure to allow crystalline growth and relaxation of amorphous orientation, while the expanded portion is at less than the final container dimensions and does not contact the inner walls of the mold cavity. The pressure is then released and the partially expanded article at least partially deflated to allow further relaxation of the amorphous orientation. The pulse-blow step is performed one or more times.

During a final expansion step, the intermediate article is fully blown to form a final container having a substantially transparent and partially crystalline body with enhanced thermal stability. During the final expansion step, the body-forming portion is caused to fill the blow mold cavity at a second low-strain rate of inflation (lower than the first high-strain rate) in order to minimize the amorphous orientation in the final container.

The increased crystallinity level in the container body increases the thermal distortion temperature of the container and thus increases the useful temperature range of the container. The minimization of the amorphous orientation regions in the container reduces the thermal shrinkage and further improves the thermal stability of the container.

One advantage of the present invention is the ability to form a container having a high-crystallinity sidewall in a single mold, whereas prior processes require multiple molds for multiple blowing or heat-setting steps. In this invention, a single mold is used and the mold is warm (e.g., 200° F./93°

C.) as opposed to hot (300°–400° F./150°–200° C.). A hot mold is not desirable during the final expansion because it produces greater post-mold shrinkage and thermal distortion. Because the mold is warm (not hot) during the pulse-blow step, the intermediate article is kept away from the wall foremost and preferably all of the time to prevent the article from cooling, which would reduce the amount of crystallization.

Another aspect of the present invention is a blow mold and fluid supply apparatus for practicing the method of this invention. The apparatus, which includes a metering chamber and piston, alternatively supplies a high-strain rate and then low-strain rate of inflation to the blow mold.

These and other objects of the present invention will be more fully described by the following drawings and description of specific embodiments of the invention.

DETAIL DESCRIPTION

A specific embodiment of the invention will be described with a seven-step process illustrated in FIG. 4, and the blow mold and fluid supply apparatus of FIGS. 1–3. The resulting container is shown in FIG. 3a.

In this embodiment, a metering pot and piston air supply apparatus 40 is used for providing a controlled pressure and expansion rate to the blow mold 10. The metering pot 44 provides a predetermined amount of air and a predetermined rate of air flow for inflating the preform in the blow mold; by controlling the volume and rate of air supplied there is a corresponding control over the pressure supplied to inflate the preform.

A preform 60 of polyethylene terephthalate (PET) is positioned in a blow mold apparatus 10. The preform includes an open top end 62 having a neck finish 64 with external screw threads 66 and a retaining flange 68. Below the neck finish there is provided a body-forming portion 70, including a tapered shoulder-forming portion 72 of increasing wall thickness moving down to a substantially constant wall thickness cylindrical sidewall-forming portion 74. Below 74 is a base-forming portion 76, including a closed hemispherical bottom end 78 and central gate 80. The specific preform structure described herein is by way of example only and does not limit the claimed invention.

Preform 60 is injection-molded and is substantially transparent and amorphous. It is heated to a predetermined temperature in the orientation temperature range of the polymer, which generally is about 20°–50° C. above the glass transition temperature (where $T_G$ for an amorphous PET preform is about 76°–80° C., and the upper end of the orientation temperature range is preferred for refill or hot-fill containers).

The preform 60 is held from the top end by a collet 24 having a central chamber 25 in sealed engagement with the neck finish 64 of the preform. The collet 24 has an upper axial bore 26 through which an axial stretch rod 30 is movable and a side bore 28 connected to the air supply apparatus 40 as described hereinafter.

The retaining flange 68 on the preform lies between the collet 24 and a neck plate 22 which sits within an upper mold part 14 of the blow-molding apparatus 10. Upper mold 14 and lower mold 18 together form an interior chamber 12 which defines the dimensions and contours of the final container. Upper mold 14 includes an upper conical shoulder-defining wall 15, and cylindrical sidewall-defining wall 16. The lower mold 18 includes an outer basewall-defining wall 19 and central recessed dome-defining wall 20 (i.e., a champagne-type base).

Figure 1:
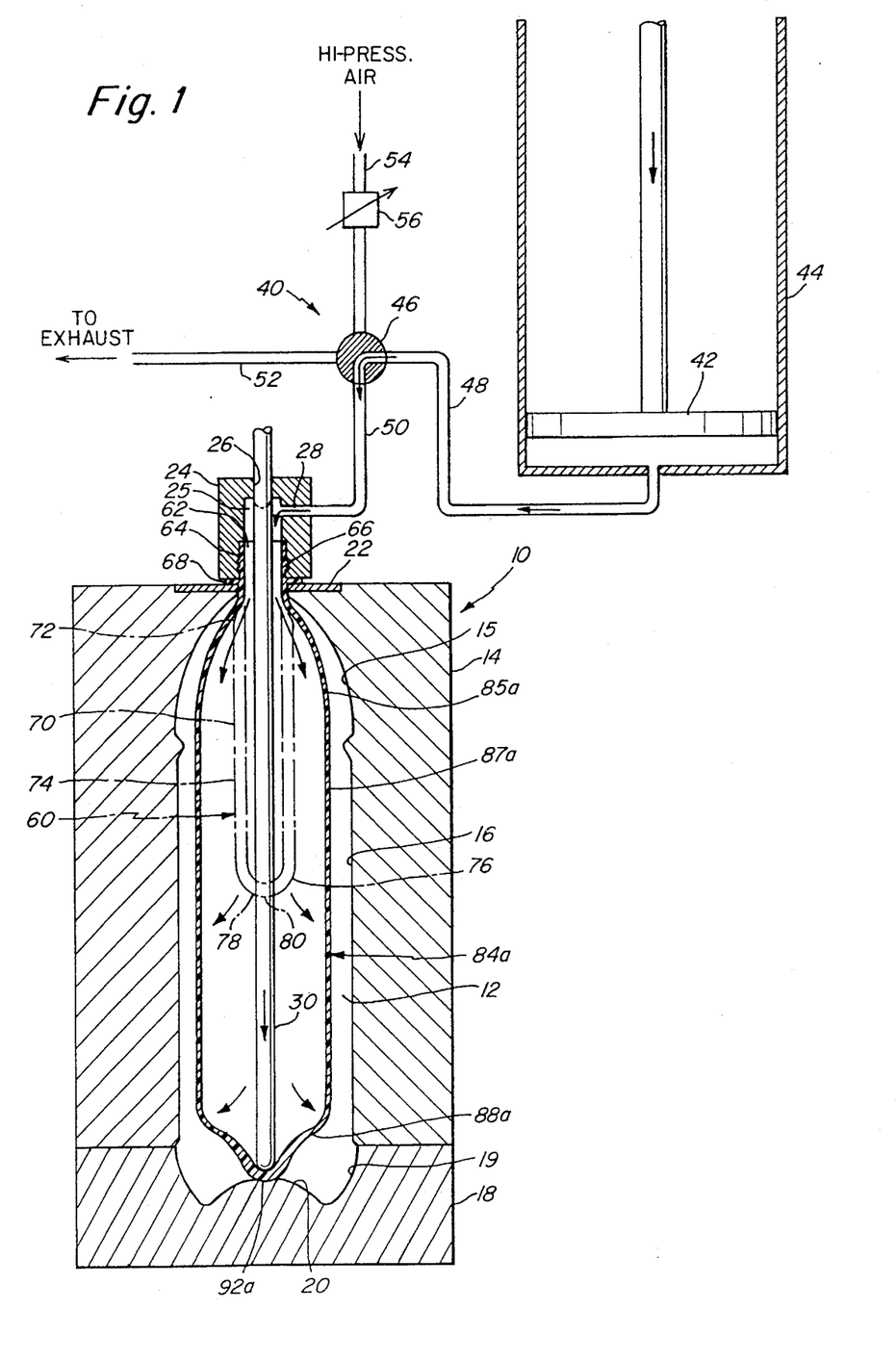
FIG. 1 is a cross-sectional view of a fluid supply and blow-molding apparatus used in the pulse-blow method of this invention for expanding a preform into a container, showing a first intermediate article.
Figure 4:
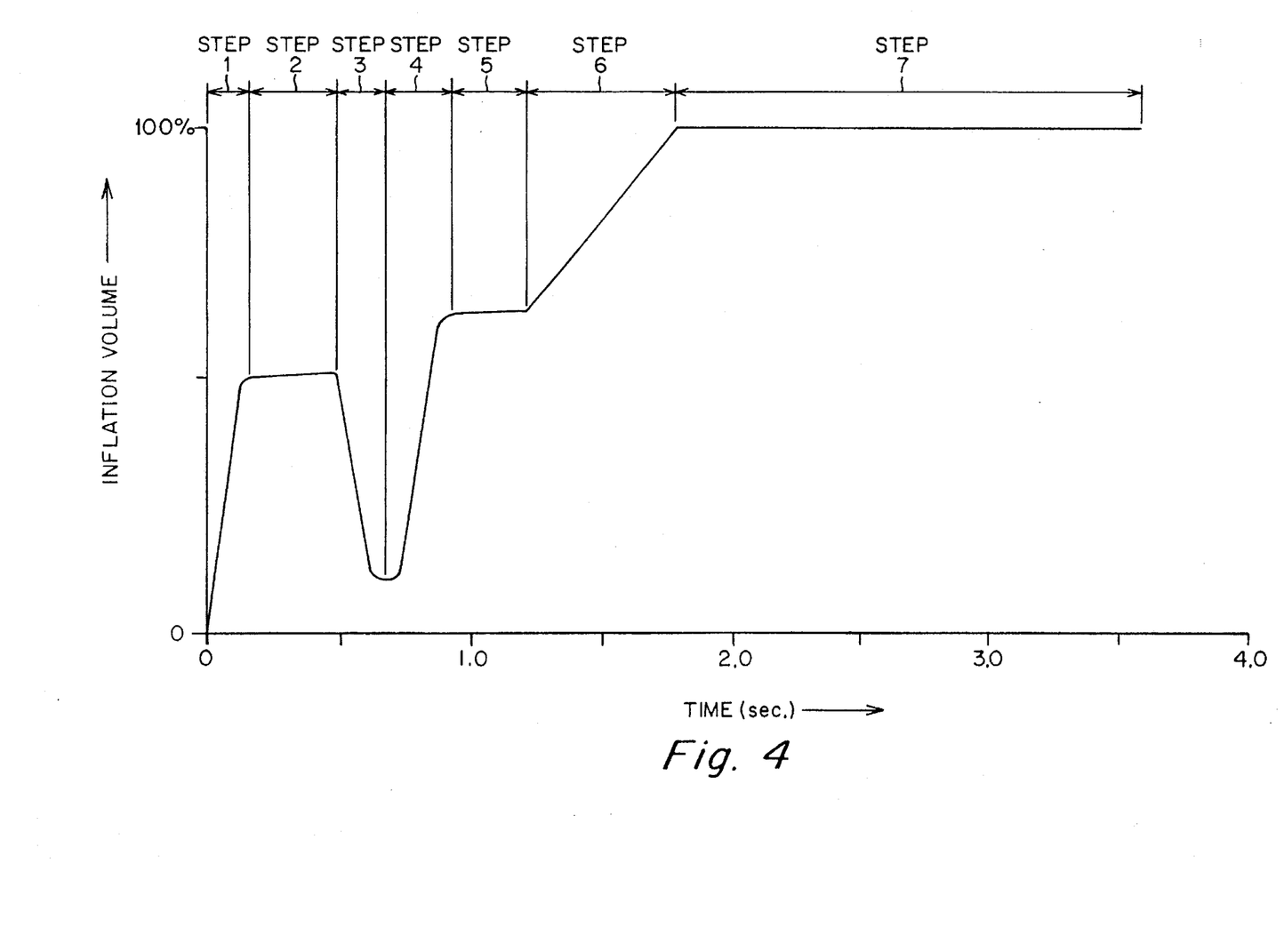
FIG. 4 is a graph of inflation volume vs. time illustrating the pressure and expansion rates during seven steps of a representative example of the method of this invention.

According to step 1 of FIG. 4, the heated preform is expanded axially and radially at a high-strain rate and low inflation pressure to form a first intermediate article 84a (FIG. 1). The preform is rapidly stretched axially by stretch rod 30 and radially expanded at a high inflation rate by a pressurized fluid in order to enhance the number of nucleating sites. At a high-strain rate of expansion, the rate of alignment (orientation) of the molecular chains is greater than the rate of relaxation of chains to their random configuration, so there is a net residual orientation. The oriented areas provide nucleating sites for crystalline growth. The specific rate of expansion is determined by the material, preform and container dimensions, and temperature. By way of example, for a PET preform expanded into a beverage container via a reheat stretch blow process, a high-strain rate would be no less than about $5 \text{ sec}^{-1}$ (for the pulse-blow step) and a low-strain rate (for the final expansion step) would be no greater than about $1 \text{ sec}^{-1}$ As used herein:

strain rate=strain/time= (change of length/original length)/time

In regard to pressure, a conventional PET reheat stretch blow process may utilize a pressure of 34 atm to form a beverage container with a footed base, while a champagne base may be formed with 20–25 atm. By way of example only, the low pressure during the pulse-blow step may be on the order of 6–10 atm while the high pressure for the final expansion is on the order of 20–40 atm.

The axial elongation is performed by stretch rod 30 which extends down the axial centerline of the preform. The lower end of the stretch rod 30 engages the gate at the bottom end of the preform, pushing it downwardly into contact with the center of a dome-defining portion 20 of lower mold 18. This helps center the intermediate article 84a in the blow mold, which is important for even orientation and expansion around the entire circumference of the article. The pressurized fluid for radially expanding the preform is supplied by input air apparatus 40 connected to side bore 28 of the collet 24. A metering chamber 44 with internal metering piston 42 provides a controlled volume of air in line 48 to a right input port of fluid control valve 46. In step 1, the air from line 48 is connected via valve 46 to a lowermost port and line 50 which is connected to side bore 28 of the collet, and directly into the open upper end 62 of the preform.

Because the preform base 78 is relatively thicker (e.g., 1.1×) than the preform sidewall 74, and because of its hemispherical shape (requiring a higher pressure to blow) and generally lower temperature, the base undergoes relatively little axial and radial expansion during the pulse-blow steps. A thick and substantially amorphous base has been found to provide increased resistance to stress cracking and creep for refill and hot-fill applications.

According to step 2 of FIG. 4, the intermediate article 84a is held inflated at a low pressure for a short duration. This allows the crystalline nucleating sites formed during step 1 to grow and thus increase the crystallinity level, while relaxing any amorphous orientation which has occurred during the step 1 expansion. The dimensions of the intermediate article 84a are smaller than the final shape and size of the container (defined by mold chamber 12) such that at least the expanded sidewall-forming portion 87a does not contact the sidewall-defining portion 16 of upper mold 14. Factors such as the preform design, the preform temperature, the pressure of the fluid and the ratio of the axial and radial expansions control the shape and size of the intermediate article 84a.

Figure 2:
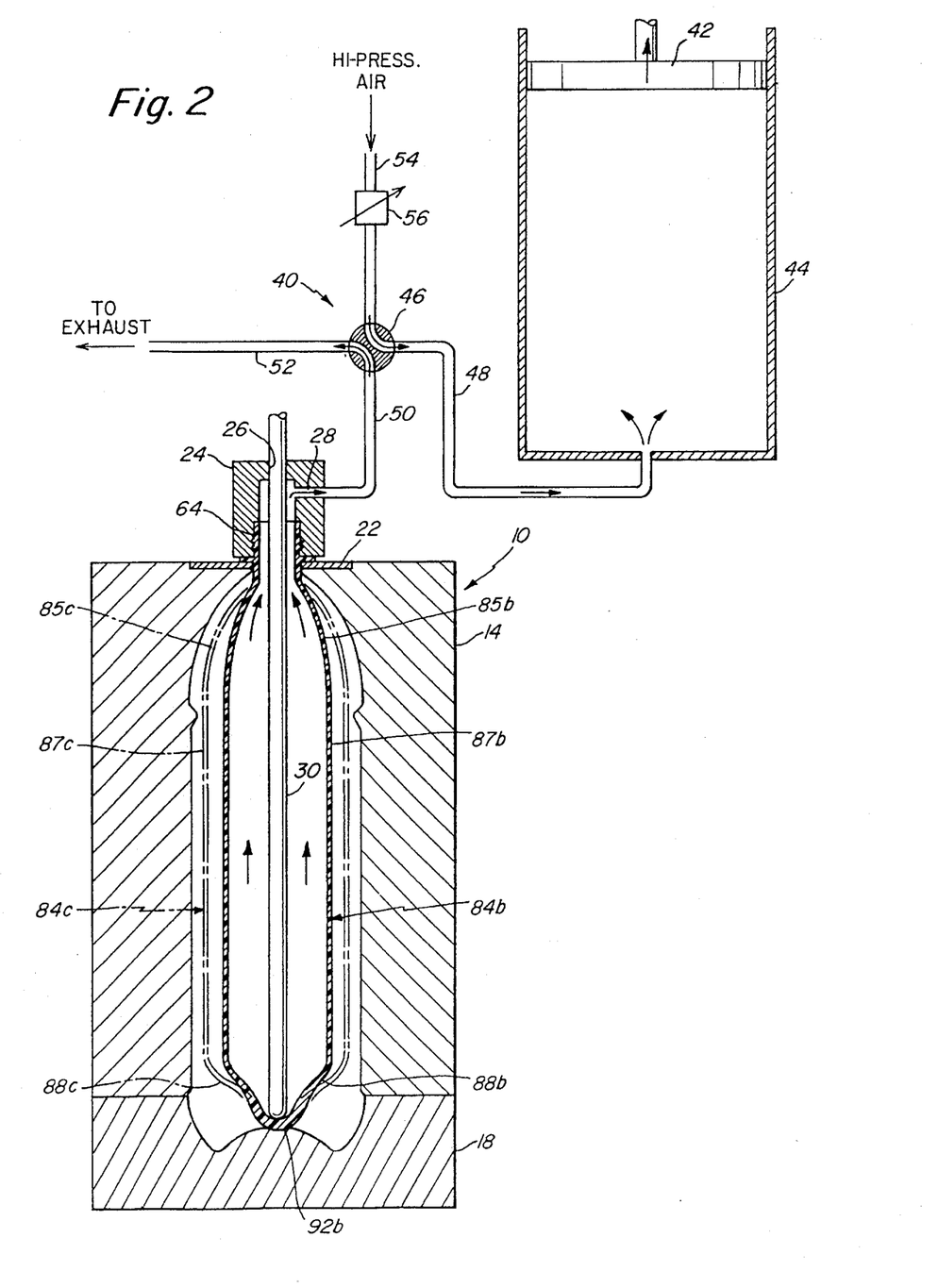
FIG. 2 is a cross-sectional view of the apparatus of FIG. 1 showing a second intermediate article following deflation, and a third intermediate article following re-expansion.
Figures 3, 3A:
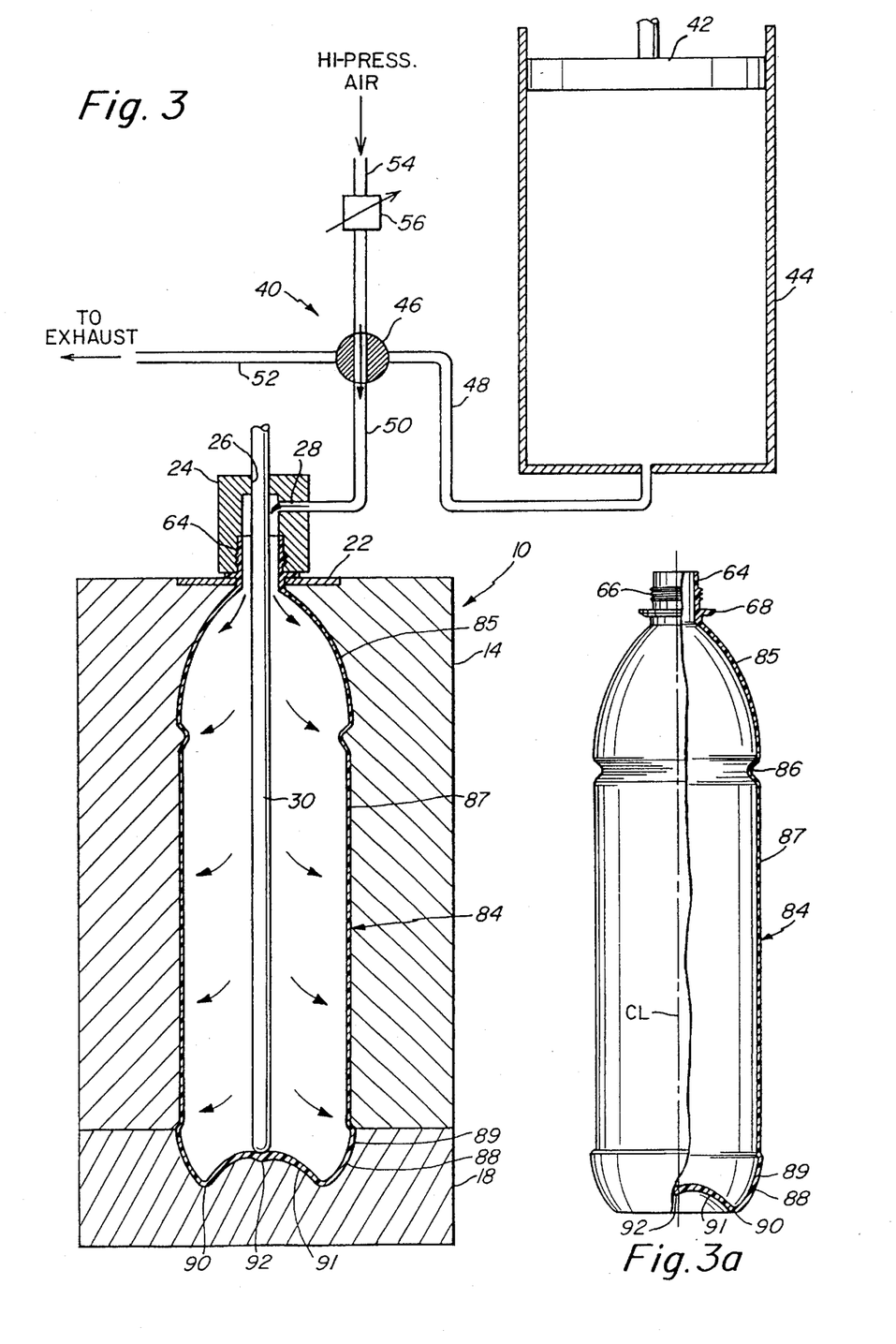
FIG. 3 is a cross-sectional view of the apparatus of FIG. 1 with the final container.
FIG. 3A is a partial sectional view of the final container.

According to step 3 of FIG. 4, and as shown in FIG. 2, there is at least a partial deflation of the first intermediate article 84a to form a contracted second intermediate article 84b. This is accomplished by adjusting control valve 46 to exhaust the air from within the article out lines 50 and 52. Meanwhile, lines 54 and 48 are connected via control valve 46 to recharge the metering pot 44 with a predetermined volume of air for a subsequent expansion step. A further relaxation of the amorphous orientation is effected during the exhaust and deflation.

According to step 4, a second high-strain rate inflation is provided to further maximize the crystalline nucleating sites and growth and form a third intermediate article 84c as shown in FIG. 2. The final pressure at step 4 is higher than the final pressure at step 1, because the partially crystalline article 84c requires a higher expansion pressure than the previously amorphous preform. The second intermediate article 84c includes an expanded shoulder 85c and cylindrical sidewall 87c; again, the base 88c has not been substantially expanded. The expanded shoulder 85c and sidewall 87c are smaller than and do not contact the mold walls. According to step 5, the intermediate article 84C is held at the second expansion pressure to allow further crystalline growth and relaxation of the amorphous orientation.

According to step 6, a final expansion step is performed at a low-strain inflation rate but higher pressure, which causes the intermediate article 84c to expand to the full dimensions of the mold chamber while minimizing the amorphous orientation. Thus, the final expansion step occurs over a relatively longer time period (see step 6 in FIG. 4) and the pressure is increased to a higher level than either of the two previous pulse-blow steps. The rate of inflation, during the final expansion step, is controlled by flow control valve 56 in line 54 between the source of high pressure air and the control valve 46.

According to step 7 the final container 84 is held at a high pressure in the mold to allow further crystalline growth and relaxation of amorphous orientation. The higher pressure is used to form the finer details of the container and to ensure complete expansion into the mold cavity. The container is allowed to cool under pressure while in contact with the mold. Then, the pressurized fluid is rapidly exhausted (as in FIG. 2) before the container is removed from the mold.

The resulting container 84, as shown in FIG. 3A, includes an open top end with the same unexpanded and substantially amorphous neck finish 64, external screw threads 66 and retaining flange 68 as in the preform 60. The tapered shoulder 85 which increases radially in diameter going down toward the sidewall, has undergone significant axial and radial expansion so as to provide significant strain-induced crystallization. The shoulder 85 is separated from the cylindrical sidewall 87 by a recessed ring 86. The sidewall 87 is the largest diameter portion of the container and has undergone the most axial and radial expansion and thus has the highest level of strain-induced crystallinity. The champagne-type base of the container 88 includes an outer base wall 88 reducing in diameter towards a lowermost chime 90 on which the container rests. Radially inwardly of the chime 90 is a central recessed dome 91 and central gate region 92. As shown in FIG. 3A, the base 89, which undergoes significantly less expansion than the sidewall and shoulder, is of increased thickness in order to compensate for the lower crystallinity of the base.

The following is a specific example utilizing the method of the present invention for forming a refillable carbonated beverage container.

EXAMPLE

A single-layer preform is provided of a polyethylene terephthalate copolymer having about 2% copolymer content, which is sold under the trade name GY8006 by The Goodyear Tire & Rubber Co., Akron, Ohio. The polymer has an intrinsic viscosity of 0.80 measured in 60/40 phenol-tetrachlorethane at 25° C. The preform has a length of about 125 mm, an outer diameter of about 30 mm, and a wall thickness in the cylindrical sidewall-forming portion of about 5.9 mm. The preform is substantially transparent and amorphous, having a percent haze of less than about 20%.

In step 1, the sidewall-forming portion 74 is rapidly axially elongated about 2.4× and radially expanded at a high-strain rate of about $10 \text{ sec}^{-1}$; both the axial and radial expansion occur over a time period of about 0.2 seconds (sec). The first intermediate article 84a has a sidewall outer diameter of about 80 mm and a sidewall thickness of about 0.56 mm. During step 2, the first intermediate article is held at a pressure of about 7.5 atmospheres (atm) for about 0.3 sec.

During step 3, the first intermediate article is rapidly deflated to a pressure of about 1.0 atm over a time period of about 0.2 sec.

During step 4, the contracted second intermediate article 84b is partially reinflated at a high-strain rate of about $10 \text{ sec}^{-1}$ over a time period of about 0.2 sec. The third intermediate article 84c thus formed is held at a pressure of about 7.5 atm for a time period of about 0.3 sec. The third intermediate article has a cylindrical sidewall portion with an outer diameter of about 85 mm and a wall thickness of about 0.53 mm.

In step 6, the third intermediate article is expanded to a high pressure at a low inflation rate of about $0.4 \text{ sec}^{-1}$ over a time period of about 0.5 sec to form the final container dimensions. The final container is held in the mold at about 34 atm for about 2.0 sec, after which the pressure is released and the container removed from the mold.

In this specific example, the neck plate is cold, e.g., a surface temperature of about 10° C. The upper mold is warm and has a surface temperature of about 88° C., and the lower mold has a surface temperature of about 10° C. Just prior to axial and radial expansion the body-forming portion of the preform and has an average temperature of about 117° C.

The resulting container has a cylindrical sidewall with a strain-induced average crystallinity of about 32%. The final container is similar to that shown in FIG. 3A, having a height of about 330 mm, an outer diameter of about 95 mm, and a cylindrical sidewall thickness of about 0.47 mm.

The percent crystallinity is determined according to ASTM 1505 as follows:

$$\% \text{ crystallinity} = [(ds-da)/(dc-da)] \times 100$$

where ds=sample density in g/cm³ da=density of an amorphous film of zero percent crystallinity (for PET 1.333 g/cm³), and dc=density of the crystal calculated from unit cell parameters (for PET 1.455 g/cm³). By "average" crystallinity is meant an average taken over the entire area of the respective container part, i.e., cylindrical sidewall portion.

If desired, the crystallinity may be further enhanced by heat setting according to known heat setting procedures. For PET, a suitable heat setting temperature is about 200°–250° C. for a time period of about 10 sec. Such heat setting is not required, but may be desirable in certain applications.

As an alternative to the metering piston for supplying a controlled volume of air, it is possible to blow the intermediate articles to a fixed pressure which expands the preform less than the full extent of the mold cavity.

As a further alternative, one may blow the intermediate article(s) in a high-temperature mold, deflate, and then transfer the intermediate article to a second lower temperature mold for the final expansion. Transfer to a second mold is not required, but may be beneficial in certain applications.

The enhanced crystallinity container of this invention is particularly useful as a refillable carbonated beverage container able to withstand numerous refill cycles while maintaining aesthetic and functional features. A test procedure for simulating such a cycle without crack failure and with a ±1.5% maximum volume change is as follows.

Each container is subjected to a typical commercial caustic wash solution prepared with 3.5% sodium hydroxide by weight and tap water. The wash solution is maintained at the desired wash temperature, e.g., 60° C., 65° C., etc. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure of a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propogating through the bottle wall which results in leakage and pressure loss. The volume change is determined by comparing the volume of liquid the container will hold at room temperature, both before and after each refill cycle.

The container can preferably withstand at least 10 refill cycles, and preferably 20 refill cycles at a wash temperature of at least 60° C. without failure, and with no more than about ±1.5 volume change in total.

For use as a refillable bottle, the bottle preferably has a relatively thick champagne base made in accordance with the prior art refill containers described in Continental PET Technologies, Inc.'s U.S. Pat. Nos. 4,725,464 and 5,066,528, which are hereby incorporated by reference in their entirety. The dome and chime form a thickened base portion having about 3–4 times the thickness of the cylindrical sidewall, and having an average crystallinity of no greater than about 10%. Radially outwardly of the chime, there is a thinner outer base portion of about 50–70% of the thickness of the thickened base portion and increasing in crystallinity up to its junction with the sidewall. The thinner outer base wall provides improved impact resistance. The thickened dome and chime provide improved resistance to caustic cracking.

A preferred planar stretch ratio is 8–12:1 for a cylindrical sidewall of a polyester refill beverage bottle of about 0.5 to 2.0 liters/volume, and more preferably about 9–11:1. The hoop stretch is preferably 3–3.6:1 and the axial stretch 2.4–3:0. This produces a container sidewall with the desired abuse resistance, and a preform sidewall with the desired visual transparency. The sidewall thickness and stretch ratio selected depend on the dimensions of the specific bottle, the internal pressure (e.g., 2 atm for beer, 4 atm for soft drinks) and the processing characteristics of the particular material (as determined for example, by the intrinsic viscosity).

The cylindrical sidewall portion of the container which is blown to the greatest extent has the highest average percent crystallinity, preferably about 25–35%. The tapered shoulder, which is also expanded substantially more than the base, preferably has an average percent crystallinity of 20–30%. In contrast, the substantially thickened and lesser blown base has a crystallinity of about 0–10% in the dome and chime, and increases in crystallinity in the outer base moving upwardly towards the sidewall. The neck finish is not expanded and remains substantially amorphous at 0–2% crystallinity.

Various levels of crystallinity can be achieved by a combination of expansion (strain-induced) and heat-setting (thermal-induced).

As previously discussed, the base has a low crystallinity because it is not stretched. Providing a thicker base and/or cooling the lower mold 18 are methods of reducing the base stretch and thus maintaining a low base crystallinity.

The preform and blown containers should be substantially transparent. A measure of transparency is the percent haze for transmitted light through the wall ($H_T$) which is given by the following formula:

$$H_T = [Y_d \div [Y_d + Y_s)] \times 100$$

where $Y_d$ is the diffuse light transmitted by the speciman, and $Y_s$ is the specular light transmitted by the speciman. The diffuse and specular light transmission values are measured in accordance with ASTM method D1003, using any standard color difference meter such as model D25D3P manufactured by Hunterlab, Inc. The container of this invention should have a percent haze (through the wall) of less than about 15%, preferably less than about 10%, and more preferably less than about 5%.

In an alternative embodiment, the container may have a substantially thinner footed base (as compared to the thicker champagne base). The footed base, which is integral with the sidewall, consists of a substantially hemispherical bottom wall with a plurality of downwardly extending legs and lowermost supporting feet on which the container rests. Radiating ribs extend between the legs and form part of the hemispherical bottom wall. A central dome portion of the hemispherical bottom wall, which does not include any legs and is relatively thicker, forms a thickened central base portion. A thinner outer base portion includes the legs, feet, and ribs. The thicker central base portion may have from 0–10% average crystallinity, while the thinner outer base portion has an average crystallinity of 10–20%.

Several polyester polymers provide the desired clarity and physical properties necessary to produce refillable plastic containers. These polymers include polyethylene terephthalate (PET), polyethylene naphthalate (PEN), acrylonitrile, polyacrylate, and polycarbonate. Of the polymers commercially available, at present PET offers the best balance of properties and cost/performance ratios. PEN is produced by reacting dimethyl 2, 6-naphthalate with ethylene glycol, and provides a higher $T_G$ and improved barrier properties over PET.

The thermoplastic polyester materials used in this invention are preferably based on polyalkylene, and in particular, polyethylene terephthalate (PET). PET polymers are prepared by polymerizing terephthalic acid or its ester forming derivative with ethylene. The polymer comprises repeating units of ethylene terephthalate of the formula As used herein "PET" means PET homopolymer and PET copolymers of the "bottle grades" suitable for making containers, which are well-known in the art. Thus, the PET copolymers may include a minor proportion, for example up to about 10% by weight, of monomer units which are compatible with the ethylene terephthalate units. For example, the glycol moiety may be replaced by an aliphatic or alicylic glycol such as cyclohexane dimethanol (CHDM). The dicarboxylic acid moiety may be substituted by an aromatic dicarboxylic acid such as isophthalic acid (IPA).

The intrinsic viscosity (IV) affects the processability of the polyester resin. Polyethylene terephthalate having an intrinsic viscosity of about 0.8 is widely used in the carbonated soft drink industry. Resins for various applications may range from about 0.55 to about 1.04, and more particularly from about 0.65 to about 0.85. Intrinsic viscosity measurements may be made according to the procedure of ASTM D-2857, by employing 0.0050±0.0002 g/ml of the polymer in a solvent comprising o-chlorophenol (melting point 0° C.), respectively, 30° C. Intrinsic viscosity is given by the following formula:

$$IV = (ln(v_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The substantially amorphous preform should have a percent haze of no more than about 20%, preferably no more than about 10%, and more preferably no more than about 5%. The preform may be single layer or multilayer and made in accordance with the well-known injection mold processes, such as described in U.S. Pat. No. 4,710,118 granted Dec. 1, 1987 to Krishnakumar et al., which is hereby incorporated by reference in its entirety.

For example, a multilayer preform may have one or more barrier layers for $O_2$ and/or $CO_2$ retention, or include layers of recycled or post-consumer PET to reduce the cost. The barrier layer may be ethylene vinyl alcohol (EVOH) or polyethylene naphthalate (PEN).

Another multilayer preform which may be used in this invention for providing enhanced sidewall crystallinity is described in copending and commonly owned U.S. Ser. No. 07/909,961 filed Jul. 7, 1992 by Collette et al. entitled "Multilayer Refillable Container, Preform and Method Of Forming Same," and U.S. Ser. No. 08/082,171 filed Jun. 30, 1993 by Collette et al. entitled "Method of Forming Multi-Layer Preform And Container With Low Crystallizing Interior Layer," which are hereby incorporated by reference in their entirety. As described therein, the preform has a core layer of a first copolymer polyester and inner and outer layers of a second polyester, wherein the second polyester has relatively less copolymer and a rate of crystallization at least about 20% higher than the first polyester. For example, the first polyester may have from about 4–6% copolymer, and the second polyester no more than about 2% copolymer. The core layer results thermal induced haze during the injection molding process, and the inner and outer layers of the container provide an enhanced level of crystallinity.

Other factors important to the manufacture of refillable polyester beverage bottles are described in U.S. Pat. Nos. 4, 334,627 to Krishnakumar et al. granted Jun. 15, 1982, 4,725,464 to Collette granted Feb. 16, 1988, and 5,066,528 to Krishnakumar et al. granted Nov. 19, 1991, which are hereby incorporated by reference in their entirety.

The materials, wall thicknesses, preform and bottle contours, may all be varied for a specific end product while still incorporating the substance of this invention. The container may be for pressurized or unpressurized beverages, including beer, juice and milk, or for non-beverage products.

The improved thermal resistance provided by this invention makes it particularly suitable for hot-fill containers. Hot-fill containers typically must withstand elevated temperatures on the order of 180–185° F. (the product filling temperature) and positive internal pressures on the order of 2–5 psi (the filling line pressure) without substantial deformation, i.e., a volume change of no greater than about ±1%. Other factors important in the manufacture of hot-fill containers are described in U.S. Pat. No. 4,863,046 to Collette et al. granted Sep. 5, 1989, which is hereby incorporated by reference in its entirety.

Although several preferred embodiments of this invention have been specifically illustrated and described herein, it is to be understood that variations may be made to the method of this invention without parting from the spirit and scope of the invention as defined in the appended claims.

What is claimed is:

1. A method of making a container having an enhanced thermal stability comprising the steps of:
   (a) providing a heated preform of an orientable and crystallizable polymer at a temperature in the orientation temperature range of the polymer, the preform being substantially transparent and amorphous, the preform having an elongated body-forming portion and a base-forming portion;
   (b) performing at least one pulse-blow step in a cavity of a blow mold to form a substantially transparent intermediate article, the pulse-blow step comprising:
      i) expanding at least the body-forming portion axially and radially at a first high-strain expansion rate to form crystal nucleation sites in the expanded body-forming portion;
      ii) holding the expanded body-forming portion under pressure to allow crystalline growth and relaxation of amorphous orientation, the expanded body-forming portion being smaller than and spaced from the cavity defining surface of the blow mold;
      iii) reducing the pressure and at least partially deflating the expanded body-forming portion to allow further relaxation of amorphous orientation; and
   (c) performing a final expansion step to form a final container having a substantially transparent and partially crystalline body with enhanced thermal stability, the final expansion step comprising expanding the at least partially deflated body-forming portion to fill the blow mold cavity at a second low-strain expansion rate to minimize the amorphous orientation.

2. The method of claim 1, wherein the pulse-blow step is repeated.

3. The method of claim 2, wherein during the last pulse-blow step prior to the final expansion step, the pressure is not reduced prior to the final expansion step.

4. The method of claim 1, wherein during the pulse-blow step the amount of expanding the body-forming portion is controlled by controlling the amount and rate of fluid admitted to the blow mold.

5. The method of claim 1, wherein an axial rod pushes a closed bottom end of the base-forming portion into contact with a bottom of the blow mold, and the base-forming portion is not substantially expanded during the pulse-blow step.

6. The method of claim 1, wherein the polymer is polyester.

7. The method of claim 6, wherein the polyester is polyethylene terephthalate (PET) homopolymer or copolymer.

8. The method of claim 1, further comprising the step of heat setting at least a portion of the body to further increase the crystallinity.

* * * * *